(12) United States Patent
Dahlke et al.

(10) Patent No.: US 9,617,659 B2
(45) Date of Patent: Apr. 11, 2017

(54) SIZED SHORT ALUMINA-BASED INORGANIC OXIDE FIBER, METHOD OF MAKING, AND COMPOSITION INCLUDING THE SAME

(71) Applicant: 3M INNOVATIVE PROPERTIES COMPANY, St. Paul, MN (US)

(72) Inventors: Gregg D. Dahlke, St. Paul, MN (US); Yong K. Wu, Woodbury, MN (US); Michael D. Crandall, North Oaks, MN (US); Ibrahim S. Gunes, Minneapolis, MN (US)

(73) Assignee: 3M Innovative Properties, St. Paul, MN (US)

( * ) Notice: Subject to any disclaimer, the term of this patent is extended or adjusted under 35 U.S.C. 154(b) by 113 days.

(21) Appl. No.: 14/409,206

(22) PCT Filed: Aug. 9, 2013

(86) PCT No.: PCT/US2013/054367
§ 371 (c)(1),
(2) Date: Dec. 18, 2014

(87) PCT Pub. No.: WO2014/028333
PCT Pub. Date: Feb. 20, 2014

(65) Prior Publication Data
US 2015/0176158 A1   Jun. 25, 2015

Related U.S. Application Data

(60) Provisional application No. 61/683,565, filed on Aug. 15, 2012.

(51) Int. Cl.
*D01F 6/60* (2006.01)
*C04B 35/622* (2006.01)
(Continued)

(52) U.S. Cl.
CPC ............ *D01F 6/60* (2013.01); *C04B 20/1037* (2013.01); *C04B 20/1051* (2013.01);
(Continued)

(58) Field of Classification Search
CPC ..................................................... C03C 25/328
See application file for complete search history.

(56) References Cited

U.S. PATENT DOCUMENTS

| 3,377,303 A | 4/1968 | Peerman |
| 3,795,524 A | 3/1974 | Sowman |

(Continued)

FOREIGN PATENT DOCUMENTS

| CN | 101381225 A | 3/2009 |
| CN | 101858037 | 10/2010 |

(Continued)

OTHER PUBLICATIONS

ASTM D3641-12, "Standard Practice for Infection Molding Test Specimens of Thermoplastic Molding and Extrusion Materials", 2012, 9 pgs.

(Continued)

*Primary Examiner* — Richard A Huhn
(74) *Attorney, Agent, or Firm* — Bradford B. Wright (57) ABSTRACT

Sized short alumina-based inorganic oxide fiber comprises, based on the total weight of the sized short alumina-based inorganic oxide fiber: from 0.1 to 15 percent by weight of a size resin comprising a polyamide; and from 85 to 99.9 percent by weight of short alumina-based inorganic oxide fiber. Methods of making the sized short alumina-based inorganic oxide fiber and compositions comprising the sized short alumina-based inorganic oxide fiber in a polymeric matrix are also disclosed.

19 Claims, 4 Drawing Sheets

(51) Int. Cl.
  *C04B 20/10* (2006.01)
  *C08J 5/06* (2006.01)
  *C04B 26/20* (2006.01)
  *C08J 5/04* (2006.01)
  *C03C 25/32* (2006.01)

(52) U.S. Cl.
  CPC ........ *C04B 26/20* (2013.01); *C04B 35/62236* (2013.01); *C08J 5/044* (2013.01); *C08J 5/046* (2013.01); *C08J 5/06* (2013.01); *C03C 25/328* (2013.01); *C04B 2235/3409* (2013.01); *C04B 2235/3418* (2013.01); *C04B 2235/526* (2013.01); *C08J 2377/00* (2013.01); *C08J 2377/02* (2013.01); *C08J 2477/06* (2013.01)

(56) References Cited

U.S. PATENT DOCUMENTS

| | | | |
|---|---|---|---|
| 3,808,015 | A | 4/1974 | Seufert |
| 4,047,965 | A | 9/1977 | Karst |
| 4,125,406 | A | 11/1978 | Sowman |
| 4,374,177 | A | 2/1983 | Hsu |
| 4,954,462 | A | 9/1990 | Wood |
| 5,038,555 | A | 8/1991 | Wu |
| 5,196,467 | A | 3/1993 | Garrett |
| 5,227,236 | A | 7/1993 | Handermann |
| 5,230,956 | A | 7/1993 | Cole |
| 5,319,019 | A | 6/1994 | Nothnagel |
| 5,605,757 | A | 2/1997 | Klett |
| 5,846,356 | A | 12/1998 | Vyakarnam |
| 6,251,520 | B1 | 6/2001 | Blizzard |
| 6,270,897 | B1 | 8/2001 | Flautt |
| 6,890,650 | B2 | 5/2005 | Hedden |
| 6,911,237 | B1 | 6/2005 | Fry |
| 7,094,468 | B2 | 8/2006 | Sugiura |
| 7,169,463 | B2 | 1/2007 | Baker |
| 7,371,464 | B2 | 5/2008 | Sherman |
| 7,575,799 | B2 | 8/2009 | Fryska |
| 7,947,376 | B2 | 5/2011 | Sherman |
| 8,039,543 | B2 | 10/2011 | Wei |
| 2006/0084742 | A1 | 4/2006 | Ishida |
| 2007/0178304 | A1 | 8/2007 | Visser |
| 2009/0092833 | A1 | 4/2009 | Schmitt |
| 2009/0263619 | A1 | 10/2009 | Pilpel |
| 2010/0117265 | A1 | 5/2010 | Gleich |
| 2010/0159243 | A1 | 6/2010 | Inoue |
| 2010/0215948 | A1 | 8/2010 | Kissounko |
| 2010/0222480 | A1 | 9/2010 | Christiansen, III |
| 2010/0260998 | A1 | 10/2010 | Waicukauski |
| 2011/0028308 | A1 | 2/2011 | Shah |
| 2011/0236684 | A1* | 9/2011 | Teschner ................ C03C 3/095 428/392 |
| 2011/0257325 | A1 | 10/2011 | Asami |
| 2012/0076573 | A1 | 3/2012 | Pilliod |

FOREIGN PATENT DOCUMENTS

| | | |
|---|---|---|
| EP | 0175484 | 3/1986 |
| EP | 0175484 A2 * | 3/1986 |
| EP | 2199446 | 6/2010 |
| JP | 62-223040 A | 10/1987 |
| JP | H03-14622 A | 1/1991 |
| JP | H10-292229 A | 11/1998 |
| JP | H11-43826 A | 2/1999 |
| JP | 3690933 B2 | 8/2000 |
| JP | 2000-302792 A | 10/2000 |
| JP | 3898379 B2 | 12/2000 |
| JP | 4216409 B2 | 1/2001 |
| JP | 4558149 B2 | 1/2002 |
| JP | 2005-213679 A | 8/2005 |
| JP | 2008-095241 A | 4/2008 |
| JP | 2010-126832 A | 6/2010 |
| JP | 2010-248030 A | 11/2010 |
| TW | 146058 | 11/1990 |
| WO | WO 97-47680 | 12/1997 |
| WO | WO 99-09105 | 2/1999 |

OTHER PUBLICATIONS

ASTM D638-10, "Standard Test Method for Tensile Properties of Plastics", 2010, 16 pgs.
ASTM D790-10, "Standard Test Methods for Flexural Properties of Unreinforced and Reinforced Plastics and Electrical Insulating Materials", 2010, 11 pgs.
International Search Report for PCT International Application No. PCT/US2013/054367, mailed on Sep. 25, 2013, 3pgs.

* cited by examiner

SIZED SHORT ALUMINA-BASED INORGANIC OXIDE FIBER, METHOD OF MAKING, AND COMPOSITION INCLUDING THE SAME

TECHNICAL FIELD

The present disclosure broadly relates to sized inorganic oxide fibers, fiber composites, and methods of making them.

BACKGROUND

High-modulus, high-strength inorganic oxide fibers are used in making many high-performance polymer composite materials. There are generally two types of polymer composites: short fiber reinforced composites and continuous fiber reinforced composites. Short fiber reinforced composites often include thermoplastics and are processed through extrusion processes. Continuous fiber reinforced composites often include thermoset resins wherein the fiber is usually pre-laid and impregnated with the resin to make a so-called "prepreg", which is then laid and cured to a specific shape. Such composite materials are usually made by extrusion compounding process, where precut short fibers are added into an extruder through a feed port. To facilitate the fiber addition, a fiber sizing agent (i.e., a fiber size) is used to keep the cut fiber in bundles until it is dispersed inside the extruder. Inadequately bundled fibers can hamper the compounding process; for example, by blocking the extruder feed port. Another important role of fiber sizing is to provide high interfacial adhesion between the inorganic oxide fiber and the polymeric matrix. Good fiber-polymeric matrix adhesion provides efficient load transfer between the fiber and the polymeric matrix allowing the inorganic oxide fiber to reinforce the matrix polymer effectively. Selection of appropriate fiber sizes has typically depended on the specific combination of fiber and polymeric matrix.

SUMMARY

The present inventors have discovered a size treatment for short alumina-based inorganic oxide fiber that enables its dispersal into polymers, especially those comprising polyamides. Sized short alumina-based inorganic oxide fiber can be readily incorporated into polymer melt streams, and typically provide good interfacial adhesion between the fibers and the polymeric matrix.

In one aspect, the present disclosure provides sized short alumina-based inorganic oxide fiber comprising, based on the total weight of the sized short alumina-based inorganic oxide fiber:

from 0.1 to 15 percent by weight of a size resin comprising a polyamide; and from 85 to 99.9 percent by weight of short alumina-based inorganic oxide fiber.

In another aspect, the present disclosure provides a composition comprising sized short alumina-based inorganic oxide fiber dispersed in a polymeric matrix, wherein the sized short alumina-based inorganic oxide fiber comprises, based on the total weight of the sized short alumina-based inorganic oxide fiber:

from 0.1 to 15 percent by weight of a size resin comprising a first polyamide; and from 85 to 99.9 percent by weight of short alumina-based inorganic oxide fiber, wherein the polymeric matrix comprises a second polyamide different from the first polyamide.

In another aspect, the present disclosure provides a method of making sized short alumina-based inorganic oxide fiber comprising:

combining an aqueous dispersion and continuous alumina-based inorganic oxide fiber to provide precursor sized continuous alumina-based inorganic oxide fiber;

at least partially drying the precursor sized continuous alumina-based inorganic oxide fiber to provide sized continuous alumina-based inorganic oxide fiber, and converting the sized continuous alumina-based inorganic oxide fiber into the sized short alumina-based inorganic oxide fiber, wherein the aqueous dispersion comprises a polyamide, and wherein based on the total weight of the sized short alumina-based inorganic oxide fiber, the sized short alumina-based inorganic oxide fiber comprises:

from 0.1 to 15 percent by weight of the polyamide; and from 85 to 99.9 percent by weight of the short alumina-based inorganic oxide fiber.

In yet another aspect, the present disclosure provides a method of making sized short alumina-based inorganic oxide fiber comprising:

combining an aqueous dispersion and short alumina-based inorganic oxide fiber to provide a precursor sized fiber;

at least partially drying the precursor sized fiber to provide the sized short alumina-based inorganic oxide fiber, wherein the aqueous dispersion comprises a polyamide, and wherein based on the total weight of the sized short alumina-based inorganic oxide fiber, the sized short alumina-based inorganic oxide fiber comprises:

from 0.1 to 15 percent by weight of the polyamide; and from 85 to 99.9 percent by weight of the short alumina-based inorganic oxide fiber.

As used herein:

the term "alumina-based" means containing at least 35 percent by weight of aluminum oxide ($Al_2O_3$) based on the total weight of the subject being referred to;

the term "fiber" refers to a single fiber or a plurality of fibers, unless otherwise specified;

the term "inorganic oxide" includes inorganic oxides that comprise crystalline ceramic, glass-ceramic, and/or amorphous phases;

the term "polyamide" refers to any polymer comprising repeated divalent segments represented by the formula:

wherein Z represents a divalent organic group, which may comprise, for example, C, H, N, O, and/or Si.

the term "short" in relation to fibers refers to fibers with an average length of less than or equal to one inch (2.54 cm).

ranges in the present disclosure are to be considered as inclusive of their end points, unless otherwise specified.

Features and advantages of the present disclosure will be further understood upon consideration of the detailed description as well as the appended claims.

It should be understood that numerous other modifications and embodiments can be devised by those skilled in the art, which fall within the scope and spirit of the principles of the disclosure. The figure may not be drawn to scale.

DETAILED DESCRIPTION

Figure 1:
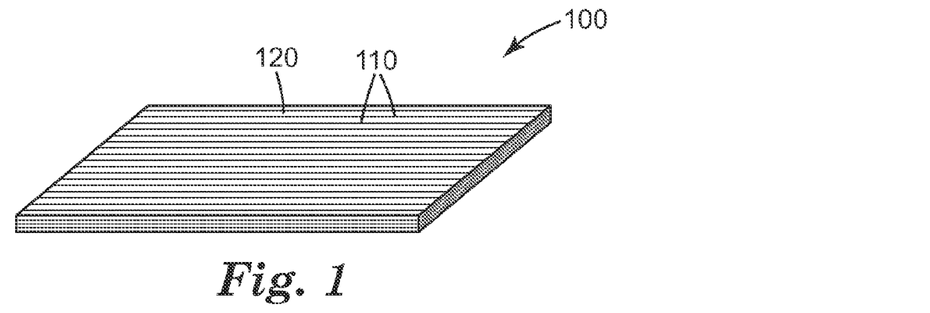
FIG. 1 is a perspective view of exemplary sized short alumina-based inorganic oxide fiber 100 according to the present disclosure.

Referring now to FIG. 1, sized short alumina-based inorganic oxide fiber 100 prepared according to the present disclosure comprises short alumina-based inorganic oxide fibers 110 and polyamide 120.

The sized short alumina-based inorganic oxide fiber comprises from 85 to 99.9 percent by weight of short alumina-based inorganic oxide fiber, based on the total weight of the sized short alumina-based inorganic oxide fiber. In some embodiments, the sized short alumina-based inorganic oxide fiber comprises from 94 to 99.5 percent by weight, or even from 96 to 99 percent by weight, of short alumina-based inorganic oxide fiber, based on the total weight of the sized short alumina-based inorganic oxide fiber.

Short alumina-based inorganic oxide fibers may be cut and/or broken. They may all have substantially the same length or they may comprise different lengths. Typically, the sized short alumina-based inorganic oxide fiber comprises a bundle of the short alumina-based inorganic oxide fibers bonded to one another by the size resin. Such a bundle can be made, for example, by chopping a sized continuous tow to produce a bundle of aligned sized short alumina-based inorganic oxide fibers.

Short alumina-based inorganic oxide fibers may have an aspect ratio of at least 10, 20, 30, 40 or even at least 50, although this is not a requirement. The short alumina-based inorganic oxide fibers typically have an average effective fiber diameter of at least about 5 micrometers, although this is not a requirement. In some embodiments, the average effective fiber diameter is less than or equal to 50 micrometers or less than or equal to 25 micrometers.

In some embodiments, the inorganic oxide fibers have an average tensile modulus of at least 100 gigapascals (GPa), at least 150 GPa, at least 200 GPa, or even at least about 300 GPa.

Short alumina-based inorganic oxide fibers used in the present disclosure are typically prepared by cutting or breaking corresponding alumina-based continuous inorganic oxide fibers. Alumina-based continuous inorganic oxide fibers are available commercially as single filaments, or grouped together in, for example, yarns or tows. Tows are well known in the fiber art and refer to a plurality of (individual) fibers (typically, at least 100 fibers, and more typically, at least 400 fibers) collected in a rope-like form. Yarns or tows typically include from several hundred to a several thousand (e.g., at least 2500) individual fibers per tow. Alumina-based inorganic oxide fibers are available in a variety of lengths, including 300 meters and larger. The inorganic oxide fibers may, for example, have a cross-sectional shape that is circular or elliptical.

Useful alumina-based inorganic oxide fibers include, for example, aluminoborosilicate fibers as described in U.S. Pat. No. 3,795,524 (Sowman) In some embodiments, the aluminoborosilicate fibers comprise, on a theoretical oxide basis: about 35 percent by weight to about 75 percent by weight (more preferably, about 55 percent by weight to about 75 percent by weight) of $Al_2O_3$; greater than 0 percent by weight (more preferably, at least about 15 percent by weight) and less than about 50 percent by weight (more preferably, less than about 45 percent, and most preferably, less than about 40 percent) of $SiO_2$; and greater than about 1 percent by weight (more preferably, less than about 25 percent by weight, even more preferably, about 1 percent by weight to about 20 percent by weight, and most preferably, about 2 percent by weight to about 15 percent by weight) of $B_2O_3$, based on the total weight of the aluminoborosilicate fibers. Preferred aluminoborosilicate fibers are commercially available as NEXTEL 312 inorganic oxide fiber from 3M Company, Maplewood, Minn.

Useful alumina-based inorganic oxide fibers also include aluminosilicate fibers. Aluminosilicate fibers, which are typically crystalline, comprise aluminum oxide in the range from about 67 to about 97 percent by weight and silicon oxide in the range from about 3 to about 33 percent by weight. Aluminosilicate fibers can be made as disclosed, for example, in U.S. Pat. No. 4,047,965 (Karst et al.). In some embodiments, the aluminosilicate fibers include, on a theoretical oxide basis, from about 67 to about 85 percent by weight of $Al_2O_3$ and from about 33 to about 15 percent by weight of $SiO_2$, based on the total weight of the aluminosilicate fibers. In some embodiments, the aluminosilicate fibers include, on a theoretical oxide basis, from about 67 to about 77 percent by weight of $Al_2O_3$ and from about 23 to about 33 percent by weight of $SiO_2$, based on the total weight of the aluminosilicate fibers. In some embodiments, the aluminosilicate fiber includes, on a theoretical oxide basis, from about 85 to about 97 percent by weight of $Al_2O_3$ and from about 3 to about 15 percent by weight of $SiO_2$, based on the total weight of the aluminosilicate fibers. Aluminosilicate fibers are commercially available, for example, as NEXTEL 550 and NEXTEL 720 aluminosilicate fiber from 3M Company.

In some embodiments, the alumina fibers include, on a theoretical oxide basis, greater than about 98 percent by weight of $Al_2O_3$ and from about 0.2 to about 1.0 percent by weight of $SiO_2$, based on the total weight of the alumina fibers. Alpha alumina fibers are available, for example, as NEXTEL 610 inorganic oxide fiber from the 3M Company.

Also useful are alumina-chromia-metal (IV) oxide fibers (e.g., as described in U.S. Pat. No. 4,125,406 (Sowman), and alumina fibers (e.g., as described in U.S. Pat. No. 3,808,015 (Seufert)).

Methods for making alumina-based inorganic oxide fibers are known in the art and include the method disclosed, for example, in U.S. Pat. No. 4,954,462 (Wood et al.). For example, fibers with a high alumina content (e.g., >60 percent by weight of alumina) can be prepared by extruding an aqueous or organic precursor gel through spinnerets and drying followed by a high temperature (>900° C.) heat treatment to form a continuous refractory yarn.

The size resin is included in the sized inorganic oxide fiber in an amount of from 0.1 to 15 percent by weight, inclusive, based on the total weight of the sized short alumina-based inorganic oxide fiber. In some embodiments, the size resin is included in the sized short alumina-based inorganic oxide fiber an amount of from 0.1 to 6 percent by weight, from 0.5 to 5 percent by weight, or even from 1 to 4 percent, based on the total weight of the sized short alumina-based inorganic oxide fiber.

Polyamides useful as the size resin include, for example, those polyamides that are useful as hot melt adhesives. Typically the size resin is aliphatic, but this is not a requirement. For example, the size resin may comprise an aromatic polyamide if desired. The size resin may be used in any form, but typically is applied to the alumina-based inorganic oxide fiber as a latex dispersion.

Examples of useful polyamides that may be included in size resins for the alumina-based inorganic oxide fiber include: nylon-6; nylon-6,6; nylon-11; nylon-12; nylon-6,12; nylon-6,9; nylon-4; nylon-4,2; nylon-4,6; nylon-7; nylon-8; ring-containing polyamides such as nylon-6,T and nylon-6,I; and polyamide copolymers (e.g., polyamide multipolymers). Examples of useful polyamides that may be used as sizes for the alumina-based inorganic oxide fiber also include those available from E.I. du Pont de Nemours and Co., Wilmington, Del., under the trade designation ELVAMIDE nylon multipolymer resin such as, for example, ELVAMIDE 8061 (m.p.=158° C.), ELVAMIDE 8063 nylon multipolymer resin (m.p.=158° C.), ELVAMIDE 8023R (m.p.=154° C.), and ELVAMIDE 8066 (m.p.=115° C.). Useful size resins include hot melt polyamides available from Arizona Chemicals, Jacksonville, Fla., under the trade designation UNI-REZ such as, for example, UNI-REZ 2620, UNI-REZ 2626, UNI-REZ 2632, UNI-REZ 2633, UNI-REZ 2635, UNI-REZ 2641, UNI-REZ 2651, UNI-REZ 2671, UNI-REZ 2672, UNI-REZ 2674, UNI-REZ 2678, UNI-REZ 2720, UNI-REZ 2721, UNI-REZ 2722, UNI-REZ 2727, and UNI-REZ TP101.

In some embodiments, the polyamide has a backbone comprising a polysiloxane segment. Examples of suitable such polyamides include silicone polyoxamide (SPOx) elastomers.

The silicone polyoxamide may contain at least two (e.g., at least 2, at least 5, at least 10, or at least 20) divalent units represented by Formula I (below):

wherein each $R^1$ independently represents alkyl, haloalkyl, aralkyl, alkenyl, aryl, or aryl substituted with an alkyl or alkoxy group, or halogen, wherein at least 50 percent of the $R^1$ groups are methyl. Each Q independently represents alkylene, aralkylene, or a combination thereof. Subscript n is independently an integer in the range of from 40 to 1500. SPOx elastomers of this type may be prepared by condensation of bis(aminopropyl)polydimethylsiloxanediamine with diethyl oxalate to provide an α,ω-ethyl oxalate-capped SPOx material.

In some embodiments, useful SPOx elastomers contain at least two (e.g., at least 2, at least 3, at least 4, or at least 5) divalent units represented by Formula II (below)

wherein p represents an integer in the range of from 1 to 10, G represents a divalent organic group (e.g., alkylene having from 1 to 20 carbon atoms). $R^2$ represents hydrogen or alkyl, or $R^2$ taken together with G and with the nitrogen to which they are both attached forms a heterocyclic group. SPOx elastomers of this type may be prepared in a two-step process. In the first step, an α,ω-bis(aminopropyl)polydimethylsiloxanediamine is end-capped with diethyl oxalate to provide n α,ω-ethyl oxalate-capped precursor silicone polyoxamide. In a second step, the end-capped product above is then condensed with an alkylenediamine (e.g. 1,2-ethylenediamine) to form the SPOx polymer.

Further details concerning SPOx polymers and methods for their synthesis can be found, for example, in U.S. Pat. No. 7,371,464 B2 (Sherman et al.).

The polyamide may be solvent coated onto the alumina-based inorganic oxide fiber, or it may be used as an aqueous dispersion. Methods of preparing solvent and aqueous dispersions of polyamides are well known in the art, and include, for example, solvent inversion or cryogenic grinding followed by dispersion using a dispersing aid.

Useful commercially available aqueous polyamide dispersions include: GENTON 310 aqueous dispersion, a 10 weight percent dispersion of ELVAMIDE 8063 nylon multipolymer resin available from General Plastics Corp., Bloomfield, N.J.; and HYDROSIZE PA845 anionic aqueous nylon dispersion from Michelman, Cincinnati, Ohio.

In some embodiments, the size resins may comprise polyamide having a relatively low melting point such as for example, less than or equal to 160° C., less than or equal to 155° C., or even less than or equal to 150° C.

Typically, the sized short alumina-based inorganic oxide fiber is essentially free of volatile liquid components, although this is not a requirement. For example, the sized short alumina-based inorganic oxide fiber may comprise less than 2 percent, less than 1 percent, less than 0.5 percent, or even less than 0.1 percent of volatile liquid components.

Sized short alumina-based inorganic oxide fiber according to the present disclosure can be prepared, for example, by combining a solvent solution or aqueous dispersion of polyamide and short alumina-based inorganic oxide fiber to provide a sized short alumina-based inorganic oxide fiber precursor, at least partially drying the sized short alumina-based inorganic oxide fiber precursor to provide the sized short alumina-based inorganic oxide fiber. Useful methods of applying the size resin to the fiber include, for example, dip coating, roll coating, and spraying.

In another embodiment, the above process may be carried out on continuous fiber tow, followed by cutting the tow into short alumina-based inorganic oxide fibers.

In some embodiments, it may be desirable to further include a silane coupling agent with the size resin.

Without wishing to be bound by theory, it is believed that the silane coupling agent can react with the surface of the alumina-based inorganic oxide fibers, forming covalent bonds thereto, and in some cases to the size resin as well, thereby enhancing adhesion of the alumina-based inorganic oxide fibers to the size and/or polymeric matrix.

Silane coupling agents include an organic group bonded to a silicon atom having from one to three hydrolyzable groups bonded thereto. The organic group may comprise an aliphatic or aromatic group, or a group having reactive functionality (e.g., —N=C=O, —NH2, —OH, and —SH).

Useful silane coupling agents may be represented by the general formula:

wherein R is a divalent organic residue (e.g., alkylene having from 1 to 8 carbon atoms), X is a hydrolyzable group, Y is a reactive functional group, and n is 1, 2, or 3. Suitable groups Y include, for example, vinyl, epoxy, acryl, methacryl, amino, mercapto, and styryl. Many other functional groups can be used, if desired, depending on the particular adhesive system being employed. Suitable hydrolyzable groups X include, for example, alkoxy, acyloxy, amino, and chlorine.

Examples of useful silane coupling agents include: 3-(2-aminoethylamino)-propyltrimethoxysilane, 3-aminopropyltriethoxysilane, (3-glycidoxypropyl)-trimethoxysilane, 3-mercaptopropyltrimethoxysilane, 3-aminopropyltriethoxysilane (available from Dow Corning, Midland, Mich. under the trade designation A-1100), 3-aminopropyltrimethoxysilane, 3-methacryloxypropyltrimethoxysilane, 3-(triethoxysilyl)propyl isocyanate, ethyl 3-(triethoxysilyl)propyl carbamate, and vinyltrimethoxysilane.

Silane coupling agent may be applied to the alumina-based inorganic oxide fiber before, after, or simultaneously with application of the size resin to the alumina-based inorganic oxide fiber. The silane coupling agent may be used without hydrolysis or may be pre-hydrolyzed before being applied to the alumina-based inorganic oxide fiber. If the silane coupling agent is applied to the surface without hydrolysis, it is typically first dissolved in anhydrous organic solvent to a dilution to give a desired quantity of the silane coupling agent on the surface after evaporation of the solvent. In such an embodiment, the silane coupling agent cures in air due to presence of adventitious water and may form strong bonds with the solid substrate. Heating the silanated surface can accelerate such curing.

If used, the silane coupling agent is typically used at a level at least sufficient to provide at least monolayer coverage of the alumina-based inorganic oxide fiber, although this is not a requirement.

The size resin may further comprise at least one additional component such as, for example, wetting agent(s), antistatic agent(s), lubricant(s), and combinations thereof.

In some embodiments, the size resin may be at least partially crosslinked (e.g, by heating, addition of a crosslinker, e-beam radiation, gamma-radiation, and/or UV radiation) after application to the fibers.

Figure 2:
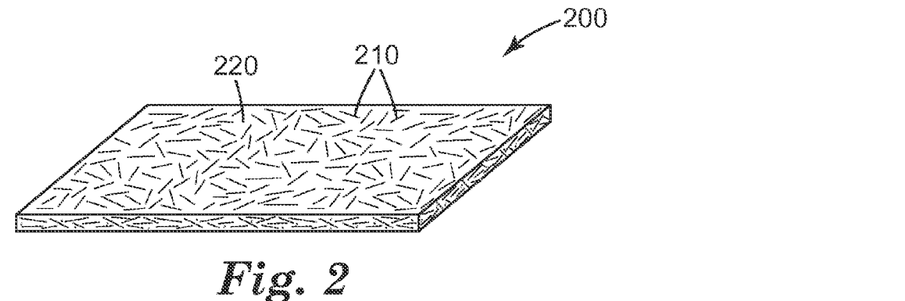
FIG. 2 is a perspective view of exemplary composition 200 according to the present disclosure.

Sized short alumina-based inorganic oxide fiber according to the present disclosure is useful, for example, for dispersing alumina-based inorganic oxide fiber in a polymeric matrix comprising a polyamide different from the polyamide contained in the size resin. Referring now to FIG. 2, composition 200 comprises sized short alumina-based inorganic oxide fiber 210 according to the present disclosure dispersed in polymeric matrix 220.

Generally, the polyamide in the polymeric matrix is chemically different (e.g., has different monomer units and/or connectivity) from the polyamide contained in the size resin; for example, nylon-6 in the size resin and nylon 6,6 in the polymer matrix.

Polyamides useful in the polymeric matrix include those given above for use in the size resin, but desirably, have relatively higher melting point. For example, polyamide in the polymeric matrix may have a melting point that is at least 20° C., at least 30° C., at least 40° C., at least 50° C., at least 60° C., at least 80° C., or even at least 100° C. higher than the melting point polyamide in the size resin. In some embodiments, For example, polyamide in the polymeric matrix has a melting point of at least 180° C., at least 230° C., at least 270° C., or even at least at least 320° C.

It should be noted that the selection of a particular polyamide material should be based upon the physical requirements of the particular intended application. Example of useful polyamides for the polymeric matrix include nylon-6, nylon-6,6, nylon-11, and nylon-12. Nylon-6 and nylon-6,6 offer better heat resistance properties than nylon-11 and nylon-12, whereas nylon-11 and nylon-12 offer better chemical resistance properties. In addition, other nylon materials such as nylon-6,12, nylon-6,9, nylon-4, nylon-4,2, nylon-4,6, nylon-7, and nylon-8 may be used, as well as ring-containing polyamides such as nylon-6,T and nylon-6, 1. Suitable nylons include VESTAMID L2140, a nylon-12 available from Creanova, Inc. of Somerset, N.J. Polyether-containing polyamides, such as PEBAX polyamides from Atochem North America, Philadelphia, Pa. may also be used.

The polymeric matrix may comprise additional one or more components such as, for example, one of more thermoplastic polymer, thermosetting resin, filler, antioxidant, light stabilizer, curative/crosslinker, and/or colorant (e.g., dyes and pigments).

In some embodiments, compositions according to the present disclosure are thermoplastic. In other embodiments, compositions according to the present disclosure are thermoset (i.e., crosslinked to the point where it is not melt-processable).

As used herein, forms of the words "comprise", "have", and "include" are legally equivalent and open-ended. Therefore, additional non-recited elements, functions, steps or limitations may be present in addition to the recited elements, functions, steps, or limitations.

SELECT EMBODIMENTS OF THE PRESENT DISCLOSURE

In a first embodiment, the present disclosure provides sized short alumina-based inorganic oxide fiber comprising, based on the total weight of the sized short alumina-based inorganic oxide fiber:

from 0.1 to 15 percent by weight of a size resin comprising a polyamide; and from 85 to 99.9 percent by weight of short alumina-based inorganic oxide fiber.

In a second embodiment, the present disclosure provides sized short alumina-based inorganic oxide fiber according to the first embodiment, wherein the polyamide has a melting point of less than or equal to 160° C.

In a third embodiment, the present disclosure provides sized short alumina-based inorganic oxide fiber according to the first or second embodiment, wherein the polyamide comprises from 0.1 to 6 percent of the total weight of the sized short alumina-based inorganic oxide fiber.

In a fourth embodiment, the present disclosure provides sized short alumina-based inorganic oxide fiber according to the first or second embodiment, wherein the polyamide comprises 1 to 4 percent of the total weight of the sized short alumina-based inorganic oxide fiber.

In a fifth embodiment, the present disclosure provides sized short alumina-based inorganic oxide fiber according to any one of the first to fourth embodiments, wherein the polyamide comprises an aliphatic polyamide.

In a sixth embodiment, the present disclosure provides sized short alumina-based inorganic oxide fiber according to any one of the first to fourth embodiments, wherein the polyamide has a backbone comprising a polysiloxane segment.

In a seventh embodiment, the present disclosure provides sized short alumina-based inorganic oxide fiber according to any one of the first to sixth embodiments, wherein the short alumina-based inorganic oxide fiber comprises at least 60 percent by weight of alumina.

In an eighth embodiment, the present disclosure provides sized short alumina-based inorganic oxide fiber according to the seventh embodiment, wherein the alumina comprises alpha alumina.

In a ninth embodiment, the present disclosure provides sized short alumina-based inorganic oxide fiber according to any one of the first to eighth embodiments, wherein the short alumina-based inorganic oxide fiber further comprises a silicon oxide.

In a tenth embodiment, the present disclosure provides sized short alumina-based inorganic oxide fiber according to the ninth embodiment, wherein the short alumina-based inorganic oxide fiber further comprises a boron oxide.

In an eleventh embodiment, the present disclosure provides sized short alumina-based inorganic oxide fiber according to any one of the first to tenth embodiments, wherein the short alumina-based inorganic oxide fiber has a length of less than 25 millimeters.

In a twelfth embodiment, the present disclosure provides sized short alumina-based inorganic oxide fiber according to any one of the first to eleventh embodiments, further comprising a reaction product of a silane coupling agent.

In a thirteenth embodiment, the present disclosure provides sized short alumina-based inorganic oxide fiber according to the twelfth embodiment, wherein the reaction product of the silane coupling agent comprises a reaction product of the silane coupling agent with the short alumina-based inorganic oxide fiber.

In a fourteenth embodiment, the present disclosure provides a composition comprising sized short alumina-based inorganic oxide fiber dispersed in a polymeric matrix, wherein the sized short alumina-based inorganic oxide fiber comprises, based on the total weight of the sized short alumina-based inorganic oxide fiber:

from 0.1 to 15 percent by weight of a size resin comprising a first polyamide; and from 85 to 99.9 percent by weight of short alumina-based inorganic oxide fiber, wherein the polymeric matrix comprises a second polyamide different from the first polyamide.

In a fifteenth embodiment, the present disclosure provides a composition according to the fourteenth embodiment, wherein the composition is thermoplastic.

In a sixteenth embodiment, the present disclosure provides a composition according to the fourteenth or fifteenth embodiment, wherein the first polyamide comprises an aliphatic polyamide.

In a seventeenth embodiment, the present disclosure provides a composition according to the fourteenth or fifteenth embodiment, wherein the first polyamide has a backbone comprising a polysiloxane segment.

In an eighteenth embodiment, the present disclosure provides a composition according to any one of the fourteenth to seventeenth embodiments, wherein the first polyamide has a melting point of less than or equal to 160° C.

In a nineteenth embodiment, the present disclosure provides a composition according to any one of the fourteenth to eighteenth embodiments, wherein the second polyamide has a melting point of at least 180° C.

In a twentieth embodiment, the present disclosure provides a composition according to any one of the fourteenth to nineteenth embodiment, wherein the size resin comprises from 0.1 to 6 percent of the total weight of the sized short alumina-based inorganic oxide fiber.

In a twenty-first embodiment, the present disclosure provides a composition according to any one of the fourteenth to twentieth embodiments, wherein the size resin comprises 1 to 4 percent of the total weight of the sized short alumina-based inorganic oxide fiber.

In a twenty-second embodiment, the present disclosure provides a composition according to any one of the fourteenth to twenty-first embodiments, wherein the short alumina-based inorganic oxide fiber comprises at least 60 percent by weight of alumina.

In a twenty-third embodiment, the present disclosure provides a composition according to the twenty-second embodiment, wherein the alumina comprises alpha alumina.

In a twenty-fourth embodiment, the present disclosure provides a composition according to any one of the fourteenth to twenty-third embodiments, wherein the short alumina-based inorganic oxide fiber further comprises a silicon oxide.

In a twenty-fifth embodiment, the present disclosure provides a composition according to the twenty-fourth embodiment, wherein the short alumina-based inorganic oxide fiber further comprises a boron oxide.

In a twenty-sixth embodiment, the present disclosure provides a composition according to any one of the fourteenth to twenty-fifth embodiments, wherein the short alumina-based inorganic oxide fiber has a length of less than 25 millimeters.

In a twenty-seventh embodiment, the present disclosure provides a composition according to the fourteenth to twenty-sixth embodiments, further comprising a reaction product of a silane coupling agent.

In a twenty-eighth embodiment, the present disclosure provides a composition according to the twenty-seventh embodiment, wherein said reaction product of a silane coupling agent comprises a reaction product of the silane coupling agent with the short alumina-based inorganic oxide fiber.

In a twenty-ninth embodiment, the present disclosure provides a method of making sized short alumina-based inorganic oxide fiber comprising:

combining an aqueous dispersion and continuous alumina-based inorganic oxide fiber to provide precursor sized continuous alumina-based inorganic oxide fiber;

at least partially drying the precursor sized continuous alumina-based inorganic oxide fiber to provide sized continuous alumina-based inorganic oxide fiber, and converting the sized continuous alumina-based inorganic oxide fiber into the sized short alumina-based inorganic oxide fiber, wherein the aqueous dispersion comprises a polyamide, and wherein based on the total weight of the sized short alumina-based inorganic oxide fiber, the sized short alumina-based inorganic oxide fiber comprises:

from 0.1 to 15 percent by weight of the polyamide; and
from 85 to 99.9 percent by weight of the short alumina-based inorganic oxide fiber.

In a thirtieth embodiment, the present disclosure provides a method according to the twenty-ninth embodiment, further comprising combining the continuous alumina-based inorganic oxide fiber with a silane coupling agent.

In a thirty-first embodiment, the present disclosure provides a method according to the twenty-ninth or thirtieth embodiment, wherein the continuous alumina-based inorganic oxide fiber comprises at least 60 percent by weight of alumina.

In a thirty-second embodiment, the present disclosure provides a method according to the thirty-first embodiment, wherein the alumina comprises alpha alumina.

In a thirty-third embodiment, the present disclosure provides a method according to any one of the twenty-ninth to thirty-second embodiments, wherein the continuous alumina-based inorganic oxide fiber further comprises a silicon oxide.

In a thirty-fourth embodiment, the present disclosure provides a method according to the thirty-third embodiment, wherein the continuous alumina-based inorganic oxide fiber further comprises boria.

In a thirty-fifth embodiment, the present disclosure provides a method of making sized short alumina-based inorganic oxide fiber comprising:

combining an aqueous dispersion and short alumina-based inorganic oxide fiber to provide a precursor sized fiber;

at least partially drying the precursor sized fiber to provide the sized short alumina-based inorganic oxide fiber, wherein the aqueous dispersion comprises a polyamide, and wherein based on the total weight of the sized short alumina-based inorganic oxide fiber, the sized short alumina-based inorganic oxide fiber comprises:

from 0.1 to 15 percent by weight of the polyamide; and
from 85 to 99.9 percent by weight of the short alumina-based inorganic oxide fiber.

In a thirty-sixth embodiment, the present disclosure provides a method according to the thirty-fifth embodiment, further comprising combining the short alumina-based inorganic oxide fiber with a silane coupling agent.

In a thirty-seventh embodiment, the present disclosure provides a method according to the thirty-fifth or thirty-sixth embodiment, wherein the short alumina-based inorganic oxide fiber comprises at least 60 percent by weight of alumina.

In a thirty-eighth embodiment, the present disclosure provides a method according to the thirty-seventh embodiment, wherein the alumina comprises alpha alumina.

In a thirty-ninth embodiment, the present disclosure provides a method according to any one of the twenty-ninth to thirty-eighth embodiments, wherein the short alumina-based inorganic oxide fiber further comprises a silicon oxide.

In a fortieth embodiment, the present disclosure provides a method according to the thirty-ninth embodiment, wherein the short alumina-based inorganic oxide fiber further comprises boron oxide.

In a forty-first embodiment, the present disclosure provides a method according to any one of the twenty-ninth to fortieth embodiments, further comprising at least partially crosslinking the polyamide after combining the polyamide with the short alumina-based inorganic oxide fiber.

In a forty-second embodiment, the present disclosure provides a method according to any one of the twenty-ninth to forty-first embodiments, wherein the polyamide has a melting point less than 160° C.

In a forty-third embodiment, the present disclosure provides a method according to any one of the twenty-ninth to forty-second embodiments, wherein the polyamide comprises an aliphatic polyamide.

In a forty-fourth embodiment, the present disclosure provides a method according to any one of the twenty-ninth to forty-second embodiments, wherein the polyamide has a backbone comprising a polysiloxane segment.

In a forty-fifth embodiment, the present disclosure provides a method according to any one of the twenty-ninth to forty-fourth embodiments, wherein the polyamide comprises from 0.1 to 6 percent of the total weight of the sized short alumina-based inorganic oxide fiber.

In a forty-sixth embodiment, the present disclosure provides a method according to any one of the twenty-ninth to forty-fifth embodiments, wherein the polyamide comprises from 1 to 4 percent of the total weight of the sized short alumina-based inorganic oxide fiber.

In a forty-seventh embodiment, the present disclosure provides a method according to any one of the twenty-ninth to forty-sixth embodiments, wherein the sized short alumina-based inorganic oxide fiber has a length of less than 25 millimeters.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Materials and abbreviations used in the Examples are reported in Table 1 (below).

TABLE 1

| ABBREVIATION | DESCRIPTION |
|---|---|
| ALFIB | 3M NEXTEL ROVING 610 inorganic oxide fiber roving, predominantly α-$Al_2O_3$, commercially available from 3M Company, St. Paul, Minnesota. The fiber roving is 10,000 denier and water-sized (sizing 100). |
| PA1 | ELVAMIDE 8063 nylon multipolymer resin, m.p. = 158° C., available from E. I. du Pont de Nemours and Co., Wilmington, Delaware. |
| PA2 | ULTRAMID B24 polyamide resin, m.p. = 220° C., commercially available from BASF North America, Florham Park, New Jersey. |

TABLE 1-continued

| ABBREVIATION | DESCRIPTION |
| --- | --- |
| PA3 | ZYTEL101 NC010 polyamide 66 resin, m.p. = 262° C., commercially available from E. I. du Pont de Nemours and Co. |
| PA4 | BS400N polyamide 6 resin commercially available from BASF North America, Florham Park, New Jersey. |
| PA5 | Poly(diorganosiloxane)-polyoxamide copolymer made from from polysiloxanediaminediamine (14,000 grams/mole molecular weight) according to the method of Preparatory Example 1 in U.S. Pat. No. 7,947,376 (Sherman et al.). |
| PADISP1 | GENTON 310 polyamide dispersion of PA1, 10 weight percent aqueous dispersion, available from General Plastics Corp., Bloomfield, New Jersey. |
| PADISP2 | An aqueous dispersion of the polyamide resin described in U.S. Pat. No. 3,377,303 (Peerman et al.), example 1, number 10, m.p. = 141° C. The resultant polyamide was dispersed in water using a solvent inversion process. A typical example of a suitable solvent inversion process can be found in U.S. Pat. No. 5,319,019 (Nothnagel). The solids content of the aqueous dispersion so generated was adjusted to 10 percent by weight with deionized water. |
| PUDISP | Polyurethane dispersion (25 percent by weight solids) prepared as described below. A mixture of ARCOL POLYOL PPG 2000 (0.003 equivalent) commercially available from Bayer Material Science LLC, Pittsburgh, Pennsylvania,, ARCOL POLYOL PPG 1025 (0.020 equivalent) commercially available from Bayer Material Science LLC, and dimethylolpropionic acid (0.024 equivalent, obtained from GEO Specialty Chemicals, Lafayette, Indiana) in 2-butanone (at 70% solids) with dibutyltin dilaurate catalyst (0.1 percent by weight), was gradually treated with an 80 percent by weight solution of H12MDI (0.069 equivalent diisocyanate, bis(4-isocyanatocyclohexyl) methane commercially available from Bayer Material Science LLC, Pittsburgh, Pennsylvania) as an 80 percent by weight solids solution in 2-butanone solvent). The mixture was stirred at 102° C. for 3-4 hr. The resultant prepolymer solution was cooled to 79° C. and then gradually added to a dilute aqueous solution of triethylamine (0.009 equivalent) and ethylenediamine (0.017 equivalent). The mixture was stirred for 1 hr with high agitation, and then stripped under reduced pressure to yield a 25 percent by weight solids aqueous polyurethane dispersion. |
| SCA1 | SILQUEST A-LINK 25 silane coupling agent (isocyanate functional) commercially available from Momentive Specialty Chemicals Inc., Columbus, Ohio. |
| SCA2 | SILQUEST A-1100 silane coupling agent (amino functional) commercially available from Momentive Specialty Chemicals Inc. |
| SCA3 | SILQUEST A-187 silane coupling agent (epoxy functional) commercially available from Momentive Specialty Chemicals Inc. |
| SCA4 | COATOSIL 1770 silane coupling agent (cycloaliphatic epoxy functional), commercially available from Momentive Specialty Chemicals. |
| WA | Q2-5211 superwetting agent (low molecular weight silicone polyether) commercially available from Dow Corning, Midland, Michigan. |

Test Methods

Tensile Properties

Tensile properties were determined according to ASTM D638-10 "Standard Test Method for Tensile Properties of Plastics."

Flexural Properties

Flexural properties were determined according to ASTM D790-10, "Standard Test Methods for Flexural Properties of Unreinforced and Reinforced Plastics and Electrical Insulating Materials" (Procedure A).

Composite Preparation and Sem Imaging

ALFIB continuous roving was dip-coated into a sizing liquid, and excess coating was removed by pinching the material between two fingers while advancing the fiber. Water was driven from the still-wet roving immersion in a forced-air oven operating at about 121° C.; typical drying times were at least 20 minutes, but not more than three hours.

Coated fiber bundles prepared in the above manner were then ready for compounding. For convenience, strips ranging in length from about 10 mm to 100 mm were cut with a scissors for feeding into a Brabender bowl heated mixer. Sixty grams of matrix polymer were first added to the mixer. Mixing temperatures were set according to the matrix resin; typically, the set point for the mixer was set from about 10° C. to 50° C. higher than the melting point of the polymer serving as the host resin. Five grams of the pre-cut coated bundles were then introduced into bowl over a period of about one minute. Mixing times were on the order of a few minutes.

Upon completion of the mixing process, the molten mixture was quickly removed from the mixing chamber and allowed to cool. The material was now ready for sample preparation for the SEM imaging.

A sample from the Brabender mixer which has cooled to room temperature was held with a pair of pliers. A second pair of pliers was used to grab the sample in a different location concurrently with the first pair of pliers. One of the pairs of pliers was then forcefully moved relative to its partner, and the sample was broken into at least two pieces.

The fracture surface of one of the pieces was then inspected for suitability for imaging. A suitable piece was then mounted into a sample holder compatible with a Phenom-World FEI Electron Microscope (PHENOM-WORLD NA, Inc, Beaverton, Oreg.). The fracture surface was surveyed for inorganic oxide fiber population, and scanning electron microscopy (SEM) images are taken as appropriate.

The suitability of the size resin was determined by examining the degree of the interfacial adhesion in the fracture surface by SEM. For a suitable size resin, at least a portion of the polymer matrix around the alumina fiber remains adhered to the fiber surface after fracture. For an unsuitable size resin, the fiber surface is bare, free of any polymer matrix.

Composite Preparation and Measurement of Physical Properties

ALFIB continuous roving was fed into a roll coating station, and coated with a sizing liquid. Water was driven from the wet roving by feeding the roving, in multiple passes, over a set of two 18.4 cm diameter hot cans set to a temperature between 125-185° C. After exiting the hot can area, the roving was level wound while still warm and saved for subsequent processing.

Prior to compounding, the roving was introduced into a rotary chopper, set as to deliver coated fiber bundle segments ranging from 3 mm to 15 mm in length, depending on the spacing of the chopping blades.

Chopped fiber bundles were added, along with pellets of matrix resin, into the feeding port of a Berstorff co-rotating twin screw extruder having an L/D of 40. The melt temperature in the extruder was set to 245° C. The molten blend traversed through the extruder and through a strand die, at which point the mixture cooled and was submersed in a water bath for additional cooling. Upon exiting the water bath, the strands were chopped using a rotating knife into pellets with a length of approximately 4 mm, and collected for further processing.

Pellets were subsequently fed into an injection molding machine from Cincinnati Milacron, Cincinnati, Ohio, operating at a temperature of 235-241° C. and a molding pressure of 3.4 megapascals (MPa) and an initial packing pressure of 4.1 MPa (final pressures are compound dependent) and molded into specimens conforming to ASTM D3641-12 "Standard Practice for Injection Molding Test Specimens of Thermoplastic Molding and Extrusion Materials" for testing of tensile properties according to ASTM D638-10 "Standard Test Method for Tensile Properties of Plastics" and flexural modulus according to ASTM D790-10 "Standard Test Methods for Flexural Properties of Unreinforced and Reinforced Plastics and Electrical Insulating Materials."

Comparative Example A

Test specimens of PA2 were prepared and tested according to the procedure in COMPOSITE PREPARATION AND MEASUREMENT OF PHYSICAL PROPERTIES, except that no fibers were added to the compound. Results are reported in Table 2.

Comparative Example B

Water-sized roving of NEXTEL 610 was dried in an oven (30 minutes at 121° C.). The fiber bundles were fed into a rotary chopper. The fiber bundles broke apart, and individual 10,000 denier fibers were isolated, leading to a physical form similar to a ball of cotton. This material could not be fed into an extruder.

Comparative Example C

Test specimens of a composite material based on PA2 were prepared according to the procedure in COMPOSITE PREPARATION AND MEASUREMENT OF PHYSICAL PROPERTIES and COMPOSITE PREPARATION AND SEM IMAGING.

Figure 3:
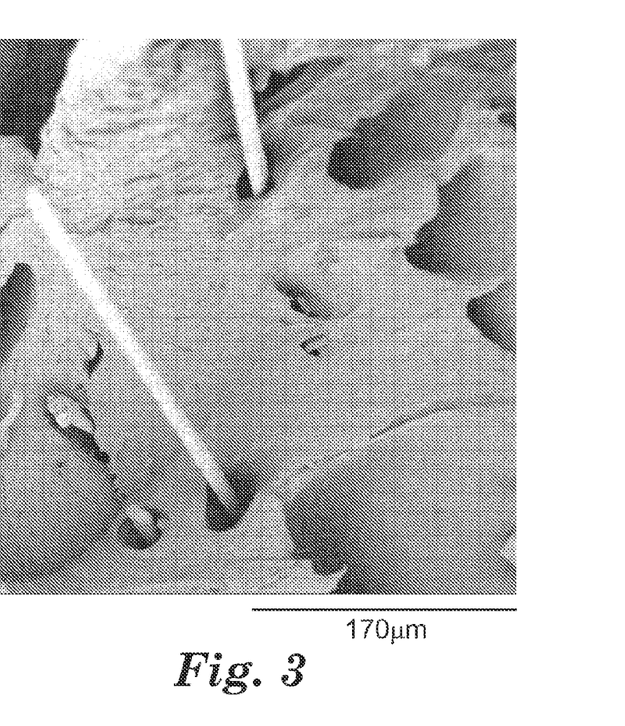
FIG. 3 is a scanning electron micrograph of the composition of Comparative Example C.

In this example, the sizing liquid was an aqueous mixture, with a total solids content of 10 percent, prepared as follows: to 72 grams of distilled water was added 36 grams of PUDISP; after stirring, 0.5 grams WA, 1.0 grams of SCA2, and 0.5 grams of SCA3 were added sequentially. This dispersion was used as the sizing on the same day it was prepared, and the fiber was coated and dried as described above. This material was compounded and molded to prepare samples for physical properties testing and for inspection by SEM imaging, as shown in FIG. 3.

Table 2 (below) reports physical properties for Comparative Examples A and C, and Example 1.

TABLE 2

| EXAMPLE | TENSILE STRENGTH, MPa | ELONGATION, percent strain at break | FLEXURAL MODULUS, GPa |
| --- | --- | --- | --- |
| Comparative Example A | 68.4 | Not applicable | 2.3 |
| Comparative Example C | 185.9 | 2.37% | 11.6 |
| 1 | 200.5 | 2.87% | 11.1 |

Example 1

Test specimens of a composite material based on PA2 were prepared according to the procedures outlined in COMPOSITE PREPARATION AND MEASUREMENT OF PHYSICAL PROPERTIES and COMPOSITE PREPARATION AND SEM IMAGING.

In this example, the sizing liquid was an aqueous mixture, with a total solids content of 10 percent by weight, prepared as follows: to 200 grams of PADISP1 were added 0.2 grams of SCA1, and 1.8 grams of distilled water. This dispersion was used as the sizing on the same day it was prepared, and the fiber was coated and dried as described above.

Figure 4:
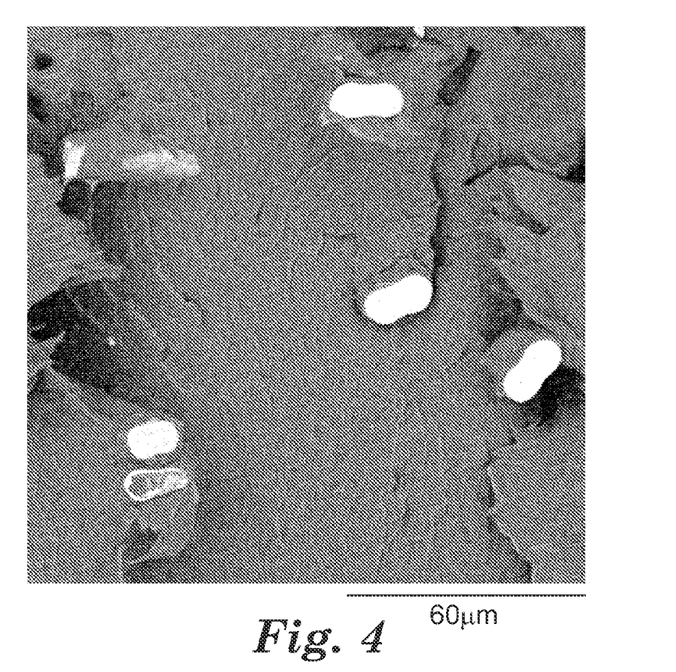
FIG. 4 is a scanning electron micrograph of the composition of Example 1.

This material was compounded and molded to prepare test specimens for physical properties testing and for inspection by SEM imaging. An SEM image showing a fracture surface of a test specimen is shown in FIG. 4.

Example 2

Test specimens of a composite material based on PA3 were prepared according to the procedures outlined in COMPOSITE PREPARATION AND SEM IMAGING. In this example, the sizing liquid was an aqueous mixture, with a total solids content of 10 percent by weight, prepared as follows.

To 200 grams of PADISP1 was added 0.2 grams of SCA1, and 1.8 grams of distilled water. This dispersion was used as the sizing on the same day it was prepared, and the fiber was coated and dried as described above.

Figure 5:
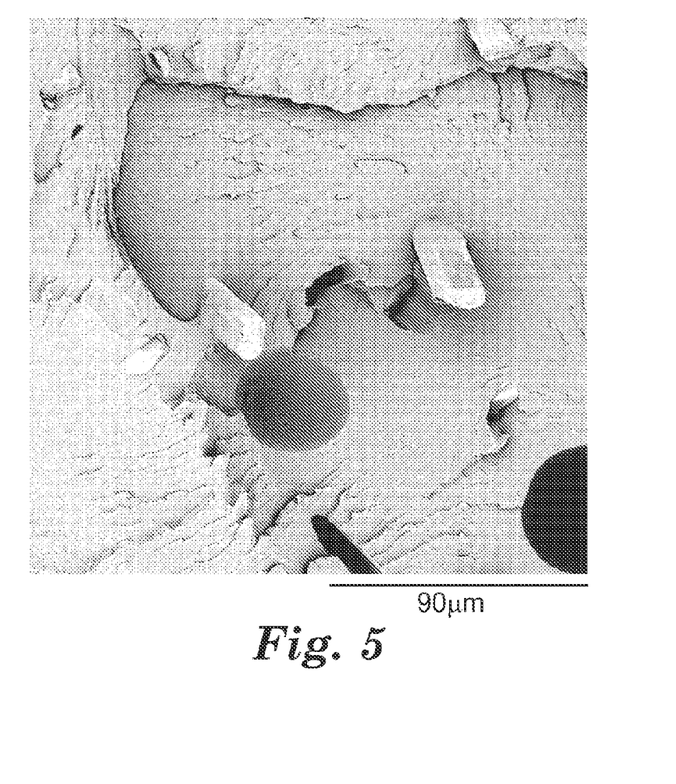
FIG. 5 is a scanning electron micrograph of the composition of Example 2.

This material was compounded and used to prepare samples for inspection by SEM imaging. An SEM image showing a fracture surface of a test specimen is shown in FIG. 5.

Example 3

Figure 6:
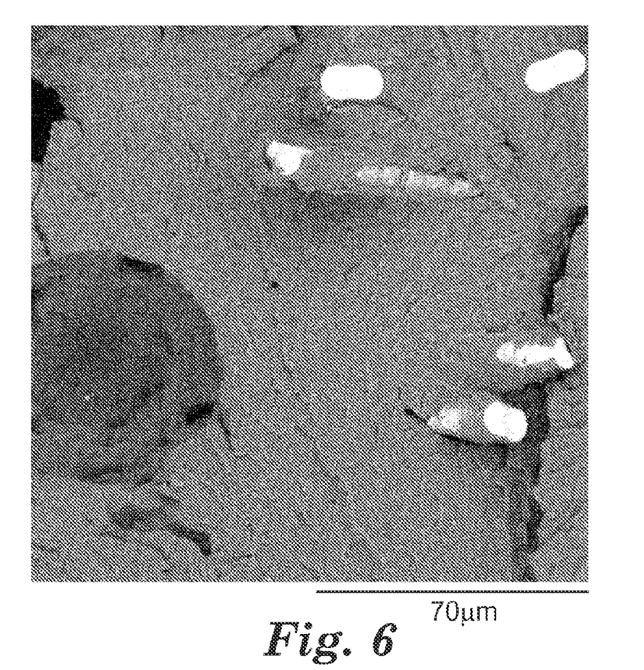
FIG. 6 is a scanning electron micrograph of the composition of Example 3.

Test specimens of composite material based on PA2 were prepared according to the procedures outlined in COMPOSITE PREPARATION AND SEM IMAGING. In this example, the sizing liquid was PADISP1, used as received. The fiber was coated and dried as described above. This material was compounded and molded to prepare samples for inspection by SEM imaging. An SEM image showing a fracture surface of a test specimen is shown in FIG. 6.

Example 4

Figure 7:
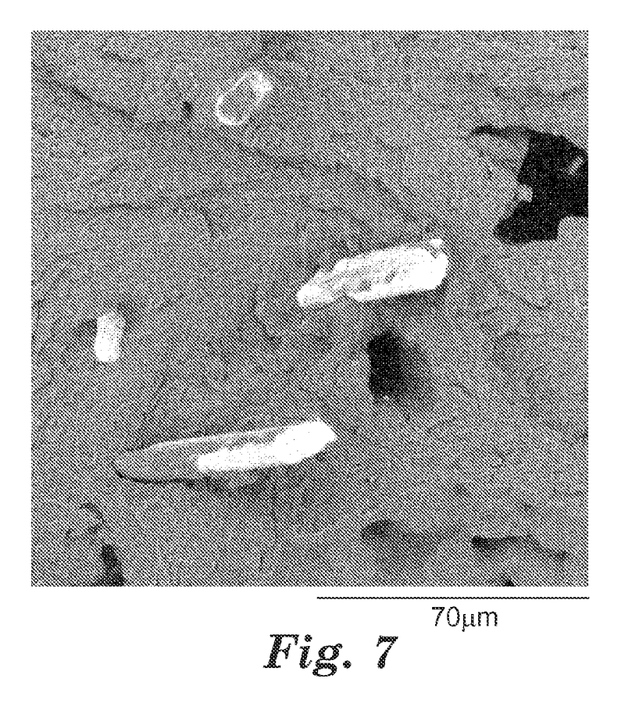
FIG. 7 is a scanning electron micrograph of the composition of Example 4.

Test specimens of a composite material based on PA2 were prepared according to the procedures outlined in COMPOSITE PREPARATION AND SEM IMAGING. In this example, the sizing liquid was an aqueous mixture, with a total solids content of 10 percent by weight. To 200 grams of PADISP2 was added 0.2 grams of SCA1 and 1.8 grams of distilled water. This dispersion was used as the sizing on the same day it was prepared, and the fiber was coated and dried as described above. This material was compounded and molded to prepare samples for inspection by SEM imaging. An SEM image showing a fracture surface of a test specimen is shown in FIG. 7.

Example 5

Figure 8:
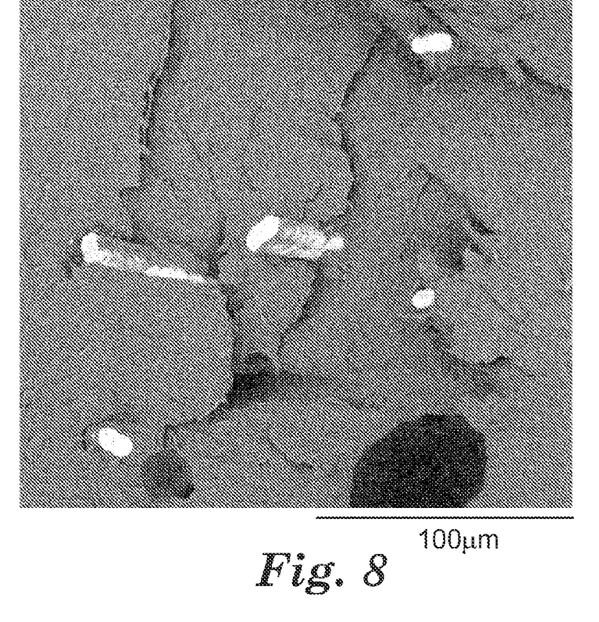
FIG. 8 is a scanning electron micrograph of the composition of Example 5.

Test specimens of a composite material based on PA2 were prepared according to the procedures outlined in COMPOSITE PREPARATION AND SEM IMAGING. In this example, the sizing liquid was an aqueous mixture, with a total solids content of 10%, prepared as follows: to 200 grams of PADISP1 were added 0.2 grams SCA4 and 1.8 grams of distilled water. This dispersion was used as the sizing on the same day it was prepared, and the fiber was coated and dried as described above. This material was compounded and molded to prepare samples for inspection by SEM imaging. An SEM image showing a fracture surface of a test specimen is shown in FIG. 8.

Example 6

PA5 (5 grams) and 900 mL of toluene were left in a glass container for 48 hours, during which they were occasionally mixed. At the end of 48 hours, a viscous, transparent, and homogenous PA5/toluene mixture was obtained, which was used as a sizing liquid.

ALFIB continuous roving (except using 4,500 denier fiber instead of 10,000 denier fiber) was dip-coated into the sizing liquid, and excess coating was removed by pinching the material between two fingers while advancing the fiber. The coated fibers were dried for 24 hours in a laboratory hood which was operating at 25° C. Based on the weights of the unsized fiber and sized and dried fiber, it was determined that the sized fiber contained 11.9 percent by weight of the size resin and 88.1 percent by weight of alumina based inorganic oxide fiber.

Coated fiber bundles prepared in the above manner were then ready for compounding. For convenience, strips ranging in length from about 10 mm to 100 mm were cut with a scissors for feeding into a Brabender bowl heated mixer. A sample of PA4 was dried at 90° C. for 24 hours in an oven under air atmosphere. Sixty grams of the dried PA4 were first added to the mixer. Mixing temperature was set at 270° C. Five grams of the pre-cut coated bundles were then introduced into bowl over a period of about one minute. Mixing times were on the order of a few minutes.

Figure 9:
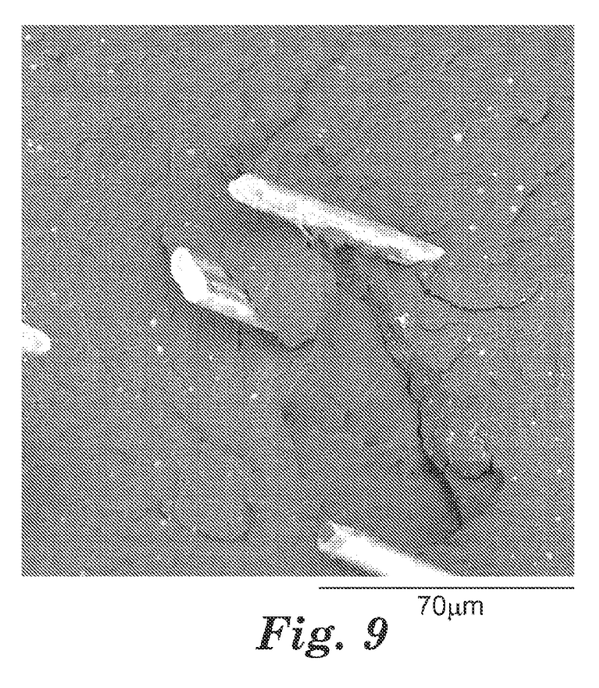
FIG. 9 is a scanning electron micrograph of the composition of Example 6.

Upon completion of the mixing process, the molten mixture was quickly removed from the mixing chamber and allowed to cool. The material was now ready for sample preparation for the SEM imaging according to the method described in the COMPOSITE PREPARATION AND SEM IMAGING procedure hereinabove. This material was compounded and molded to prepare samples for inspection by SEM imaging. An SEM image showing a fracture surface of a test specimen is shown in FIG. 9.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. Sized short alumina-based inorganic oxide fiber comprising, based on the total weight of the sized short alumina-based inorganic oxide fiber:
   from 0.1 to 15 percent by weight of a size resin comprising a polyamide, wherein the polyamide has a melting point of less than or equal to 160° C.; and
   from 85 to 99.9 percent by weight of short alumina-based inorganic oxide fiber.

2. Sized short alumina-based inorganic oxide fiber according to claim 1, wherein the polyamide comprises from 0.1 to 6 percent of the total weight of the sized short alumina-based inorganic oxide fiber.

3. Sized short alumina-based inorganic oxide fiber according to claim 1, wherein the polyamide comprises an aliphatic polyamide.

4. Sized short alumina-based inorganic oxide fiber according to claim 1, wherein the polyamide has a backbone comprising a polysiloxane segment.

5. Sized short alumina-based inorganic oxide fiber according to claim 1, wherein the short alumina-based inorganic oxide fiber comprises at least 60 percent by weight of alumina.

6. Sized short alumina-based inorganic oxide fiber according to claim 5, wherein the alumina comprises alpha alumina.

7. Sized short alumina-based inorganic oxide fiber according to claim 1, wherein the short alumina-based inorganic oxide fiber further comprises a silicon oxide.

8. Sized short alumina-based inorganic oxide fiber according to claim 7, wherein the short alumina-based inorganic oxide fiber further comprises a boron oxide.

9. Sized short alumina-based inorganic oxide fiber according to claim 1, wherein the short alumina-based inorganic oxide fiber has a length of less than 25 millimeters.

10. A composition comprising sized short alumina-based inorganic oxide fiber dispersed in a polymeric matrix, wherein the sized short alumina-based inorganic oxide fiber comprises, based on the total weight of the sized short alumina-based inorganic oxide fiber:
   from 0.1 to 15 percent by weight of a size resin comprising a first polyamide; and
   from 85 to 99.9 percent by weight of short alumina-based inorganic oxide fiber, wherein the polymeric matrix comprises a second polyamide different from the first polyamide, and
wherein the composition is thermoplastic.

11. A composition according to claim 10, wherein the first polyamide has a melting point of less than or equal to 160° C.

12. A composition according to claim 10, wherein the second polyamide has a melting point of at least 180° C.

13. A composition according to claim 10, wherein the size resin comprises from 0.1 to 6 percent of the total weight of the sized short alumina-based inorganic oxide fiber.

14. A composition according to claim 10, wherein the short alumina-based inorganic oxide fiber comprises at least 60 percent by weight of alumina.

15. A composition according to claim 10, wherein the short alumina-based inorganic oxide fiber has a length of less than 25 millimeters.

16. A method of making sized short alumina-based inorganic oxide fiber comprising:
   combining an aqueous dispersion and continuous alumina-based inorganic oxide fiber to provide precursor sized continuous alumina-based inorganic oxide fiber;
   at least partially drying the precursor sized continuous alumina-based inorganic oxide fiber to provide sized continuous alumina-based inorganic oxide fiber, wherein the continuous alumina-based inorganic oxide fiber comprises at least 60 percent by weight of alumina, and
   converting the sized continuous alumina-based inorganic oxide fiber into the sized short alumina-based inorganic oxide fiber, wherein the aqueous dispersion comprises a polyamide, and wherein based on the total weight of the sized short alumina-based inorganic oxide fiber, the sized short alumina-based inorganic oxide fiber comprises:
      from 0.1 to 15 percent by weight of the polyamide; and
      from 85 to 99.9 percent by weight of the short alumina-based inorganic oxide fiber.

17. A method according to claim 16, further comprising combining the continuous alumina-based inorganic oxide fiber with a silane coupling agent.

18. A method of making sized short alumina-based inorganic oxide fiber comprising:
   combining an aqueous dispersion and short alumina-based inorganic oxide fiber to provide a precursor sized fiber;
   at least partially drying the precursor sized fiber to provide the sized short alumina-based inorganic oxide fiber, wherein the aqueous dispersion comprises a polyamide, and wherein based on the total weight of the sized short alumina-based inorganic oxide fiber, the sized short alumina-based inorganic oxide fiber comprises:
      from 0.1 to 15 percent by weight of the polyamide; and
      from 85 to 99.9 percent by weight of the short alumina-based inorganic oxide fiber,
   further comprising combining the short alumina-based inorganic oxide fiber with a silane coupling agent.

19. A method according to claim 18, wherein the short alumina-based inorganic oxide fiber comprises at least 60 percent by weight of alumina.

* * * * *